US012549883B2

(12) United States Patent
Min et al.

(10) Patent No.: US 12,549,883 B2
(45) Date of Patent: Feb. 10, 2026

(54) EARPHONE MODES OF OPERATION

(71) Applicant: Nokia Technologies Oy, Espoo (FI)

(72) Inventors: Chulhong Min, Cambridge (GB); Alessandro Montanari, Cambridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 270 days.

(21) Appl. No.: 18/355,674

(22) Filed: Jul. 20, 2023

(65) Prior Publication Data

US 2024/0040299 A1 Feb. 1, 2024

(30) Foreign Application Priority Data

Jul. 28, 2022 (EP) .................................... 22187470

(51) Int. Cl.
*H04R 1/10* (2006.01)

(52) U.S. Cl.
CPC .................................. *H04R 1/1041* (2013.01)

(58) Field of Classification Search
CPC ................ H04R 1/1016; H04R 1/1041; H04R 2201/109
USPC ............................................................ 381/74
See application file for complete search history.

(56) References Cited

U.S. PATENT DOCUMENTS

| | | | |
|---|---|---|---|
| 9,049,508 B2 | 6/2015 | Puskarich et al. | |
| 9,113,246 B2 | 8/2015 | Bastide et al. | |
| 10,097,924 B2 | 10/2018 | Peterson et al. | |
| 10,460,095 B2 | 10/2019 | Boesen | |
| 10,575,086 B2 | 2/2020 | Boesen | |
| 2018/0279038 A1* | 9/2018 | Boesen | H04W 76/10 |
| 2021/0127352 A1 | 4/2021 | Agrawal et al. | |
| 2021/0144479 A1 | 5/2021 | Kraemer et al. | |
| 2022/0053270 A1* | 2/2022 | Ko | H04W 4/38 |

FOREIGN PATENT DOCUMENTS

| | | |
|---|---|---|
| EP | 2451188 A2 | 5/2012 |
| EP | 3884651 A1 | 9/2021 |
| WO | 2021/154231 A1 | 8/2021 |

OTHER PUBLICATIONS

"Use Siri with AirPods Pro (all generations)", Apple Support (UK), Retrieved on Aug. 16, 2023, Webpage available at : https://support.apple.com/en-gb/guide/airpods/dev66e863a57/web pp 1-2.

"Smart earbuds: top biometric headphones", gadgets and wearables, Retrieved on Aug. 16, 2023, Webpage available at : https://support.apple.com/en-https://gadgetsandwearables.com/2019/12/08/top-biometric-headphones/ pp. 1-14.

(Continued)

*Primary Examiner* — Paul Kim
(74) *Attorney, Agent, or Firm* — SQUIRE PATTON BOGGS (US) LLP

(57) ABSTRACT

An apparatus, method and computer program is described comprising: obtaining first sensor data from a first earphone of a pair of earphones; obtaining second sensor data from a second earphone of the pair of earphones; operating in a first mode in the event that the pair of earphones is determined to be worn or used by a single user; and operating in a second mode in the event that the pair of earphones is determined to be worn or used by different users.

15 Claims, 9 Drawing Sheets

(56) References Cited

OTHER PUBLICATIONS

"Amazon's Echo Buds can now track your running workouts", The Verge, Retrieved on Aug. 16, 2023, Webpage available at : https://support.apple.com/en-https://www.theverge.com/2020/11/23/21593991/amazon-alexa-echo-buds-workouts-fitness-tracking-wireless-headphones, pp. 1-15.
"Are AirPods Out? Why Cool Kids Are Wearing Wired Headphones", WSJ, Retrieved on Aug. 16, 2023, Webpage available at : https://support.apple.com/en-https://www.wsj.com/articles/are-airpods-out-why-cool-kids-are-wearing-wired-headphones-1163675340, pp. 1-2.
Gao et al., "EarEcho: Using ear canal echo for wearable authentication", Proceedings of the ACM on Interactive, Mobile, Wearable and Ubiquitous Technologies, vol. 3, No. 3, Article No. 81, Sep. 2019, pp. 1-24.
Ferlini et al., "EarGate: gait-based user identification with in-ear microphones", Proceedings of the 27th Annual International Conference on Mobile Computing and Networking, Oct. 2021, pp. 337-349.
"Bump (application)", Wikipedia, Retrieved on Aug. 16, 2023, Webpage available at : https://en.wikipedia.org/wiki/Bump_(application), pp. 1-6.
"NEC earbuds showcase hands-free biometric verification", New Atlas, Retrieved on Aug. 16, 2023, Webpage available at : https://newatlas.com/NEC-biometric-earbud-hearables/49651/, pp. 1-9.
Extended European Search Report received for corresponding European Patent Application No. 22187470.4, dated Jan. 20, 2023, 11 pages.
European Communication pursuant to Article 94(3) EPC, corresponding to EP Application No. 22 187 470.4 dated Oct. 16, 2025.

* cited by examiner

EARPHONE MODES OF OPERATION

FIELD

The present specification relates to earphones. In particular, the specification relates to modes of operation for earphones.

BACKGROUND

The use of earphones (e.g. wireless or wired earphones) to provide services other than audio output is known. For example, earphone may include sensors and user interfaces. There remains a need for further developments in this field.

SUMMARY

In a first aspect, this specification provides an apparatus comprising means for performing: obtaining first sensor data from a first earphone of a pair of earphones; obtaining second sensor data from a second earphone of the pair of earphones; operating in a first mode in the event that the pair of earphones is determined to be worn or used by a single user; and operating in a second mode in the event that the pair of earphones is determined to be worn or used by different users. The term "earphone" as used herein is used herein to describe a range of audio output devices, such as earbuds, and encompasses both wireless and wired earphones, earbuds and the like.

The first and second data may take many forms. The data may be physiological data (e.g. for fitness tracking). Other examples include inertial measurement unit data, microphone data (e.g. for detecting internal body sounds), RSSI data, galvanic skin response data, EEG data and PPG data.

In some example embodiments, in the first mode, the first and second sensor data are treated as being related to said single user and in the second mode, the first and second sensor data are treated as being related to said different users.

Some example embodiments further comprise means for performing: disabling a voice command interface when the apparatus is operating the second mode. Other functions could be disabled or deactivated in the second mode instead of, or in addition to, a voice command interface.

Some example embodiments further comprise means for performing: providing obtained user data to the respective user when the apparatus is operating in the second mode. The user data may be provided to the respective user and not to any other user.

Some example embodiments further comprise means for performing: selecting an audio output mode depending on whether the apparatus is operating in the first mode or the second mode. For example, a stereo output may be provided only in the first mode. Active noise cancellation may be disabled in the second mode. Other audio modes may be similarly controlled.

Some example embodiments further comprise means for performing: identifying an original user and a new user when the apparatus changes from operating in the first mode to operating in the second mode. The original user may be identified based on at least one of continuity and similarity of sensor data. The apparatus may further comprise means for performing: separating sensor data for the original user and the new user in the second modes. Sensor data for the original user may be retained in both the first and second modes. Sensor data for the new user may be discarded in the second mode. Some example embodiments further comprise means for performing: providing a separate user interface for each of the original and new users.

Some example embodiments further comprise means for performing: enabling bi-directional audio exchange (e.g. a so-called "walkie-talkie" mode of operation) between the earphones of the pair when the apparatus is operating in the second mode. A prompt may be provided to enable this mode.

Some example embodiments further comprise means for performing: determining whether the pair of earphones is being worn or used by said single user or by said different users. In some embodiments, data processing for determining is performed at the apparatus (e.g. at an earphone); in some other embodiments at least some of said data processing is performed elsewhere (e.g. at a connected smartphone or similar device). Some example embodiments further comprise means for performing: determining a correlation between said first and second sensor data, wherein said means for determining whether the pair of earphones is being worn or used by said single user or by said different users is dependent on the degree of correlation between said first and second sensor data. In the event that said sensor data includes data from a plurality of sensor types, the means for determining said correlation may determine said correlation separately for each sensor type. The separately generated correlations may be merged (e.g. fused) into a single implemented, for example using a weighted average or a machine learning algorithm.

The said means may comprise: at least one processor and at least one memory storing instructions that, when executed by the at least one processor, cause the apparatus to perform the operations as described with reference to the first aspect.

In a second aspect, this specification provides a method comprising: obtaining first sensor data from a first earphone of a pair of earphones; obtaining second sensor data from a second earphone of the pair of earphones; operating in a first mode in the event that the pair of earphones is determined to be worn or used by a single user; and operating in a second mode in the event that the pair of earphones is determined to be worn or used by different users. In the first mode, the first and second sensor data may be treated as being related to said single user and in the second mode, the first and second sensor data may be treated as being related to said different users.

The method may further comprise disabling a voice command interface in the second mode. Other functions could be disabled or deactivated in the second mode instead of, or in addition to, a voice command interface.

The method may further comprise providing obtained user data to the respective user when the apparatus is operating in the second mode. The user data may be provided to the respective user and not to any other user.

The method may further comprise selecting an audio output mode depending on whether the apparatus is operating in the first mode or the second mode.

The method may further comprise identifying an original user and a new user when changing from operating in the first mode to operating in the second mode. The method may further comprise separating sensor data for the original user and the new user in the second modes. Sensor data for the original user may be retained in both the first and second modes. Sensor data for the new user may be discarded in the second mode.

The method may further comprise providing a separate user interface for each of the original and new users.

The method may further comprise enabling bi-directional audio exchange between the earphones of the pair when the apparatus is operating in the second mode. A prompt may be provided to enable this mode.

The method may further comprise determining whether the pair of earphones is being worn or used by said single user or by said different users.

The method may further comprise determining a correlation between said first and second sensor data, wherein said means for determining whether the pair of earphones is being worn or used by said single user or by said different users is dependent on the degree of correlation between said first and second sensor data.

In a third aspect, this specification describes computer-readable instructions which, when executed by a computing apparatus, cause the computing apparatus to perform (at least) any method as described with reference to the second aspect.

In a fourth aspect, this specification describes a computer-readable medium (such as a non-transitory computer-readable medium) comprising program instructions that, when executed by an apparatus, cause the apparatus to perform (at least) any method as described with reference to the second aspect. The term "non-transitory" as used herein is a limitation of the medium itself (i.e. a tangible, not a signal) as opposed to a limitation on data storage persistency.

In a fifth aspect, this specification describes an apparatus comprising: at least one processor; and at least one memory including computer program code, wherein the at least one memory and the computer program code are configured, with the at least one processor, to cause the apparatus to perform (at least) any method as described with reference to the fourth to sixth aspects.

In a sixth aspect, this specification describes a computer program comprising instructions which, when executed by an apparatus, cause the apparatus to perform at least the following: obtaining first sensor data from a first earphone of a pair of earphones; obtaining second sensor data from a second earphone of the pair of earphones; operating in a first mode in the event that the pair of earphones is determined to be worn or used by a single user; and operating in a second mode in the event that the pair of earphones is determined to be worn or used by different users.

In a seventh aspect, this specification describes a first input (or some other means) for obtaining first sensor data from a first earphone of a pair of earphones; a second input (or some other means) for obtaining second sensor data from a second earphone of the pair of earphones; a first control module (or some other means) for operating in a first mode in the event that the pair of earphones is determined to be worn or used by a single user; and the first control module, a second control module or some other means for operating in a second mode in the event that the pair of earphones is determined to be worn or used by different users.

BRIEF DESCRIPTION OF THE DRAWINGS

Example embodiments will now be described, by way of example only, with reference to the following schematic drawings, in which.

DETAILED DESCRIPTION

Figure 1:
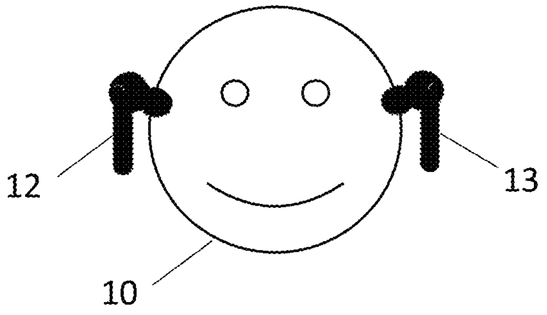
FIG. 1 shows a user using earphones in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 shows a user 10 using a pair of earphones 12, 13 in accordance with an example embodiment. It should be noted that the term "earphone" is used herein to describe a range of audio output devices, such as earbuds, and encompasses both wireless and wired earphones, earbuds and the like.

Some earphones incorporate various features, such as sensors, context monitoring capabilities and conversational interfaces. Beyond high-quality audio, such earphones may be expected to provide new services, such as providing access to virtual assistants, performing biometric measurements, fitness tracking etc. Applications of this nature may assume that a pair of earphones is being worn by a single user and may fuse sensor data from two earphones (left and right). However, this is not always the case.

Figure 2:
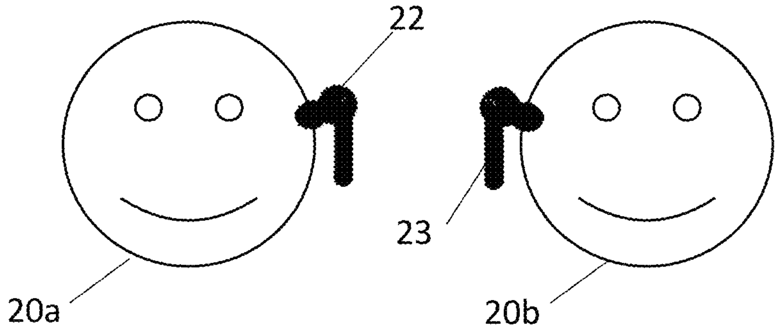
FIG. 2 shows a pair of users using earphones in accordance with an example embodiment.

FIG. 2 shows a first user 20*a* and a second user 20*b* using a pair of earphones 22, 23 in accordance with an example embodiment. The earphones 22 and 23 may be the earphones 12 and 13 described above with reference to FIG. 1. By way of example, the users 20*a*, 20*b* may share the earphones in order to listen to music or when watching a video clip together.

In the case of applications that assume that a pair of earphones is being worn by a single user, the sharing of a pair of earphones between a pair of users could lead to application behaving in unexpected, unplanned or undesirable ways. For example, embarrassing moments could occur (e.g., playing a private message as an audio notification), service quality may be degraded (e.g., playing music in a stereo mode), or sensing may be inaccurate (e.g., blood pressure monitoring, fitness tracking).

Figure 3:
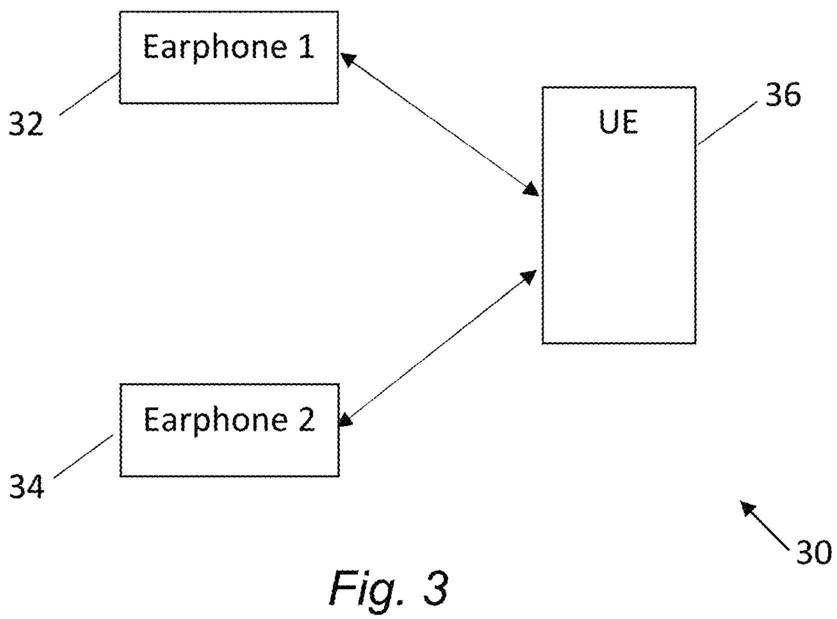
FIG. 3 is a block diagram of a system in accordance with an example embodiment.

FIG. 3 is a block diagram of a system, indicated generally by the reference numeral 30, in accordance with an example embodiment. The system 30 comprises a first earphone 32, a second earphone 34 and a user device 36 (such as a mobile communication device, user equipment or similar device). The first and second earphones 32 and 34 may form a pair, as discussed above with reference to FIGS. 1 and 2.

Figure 4:
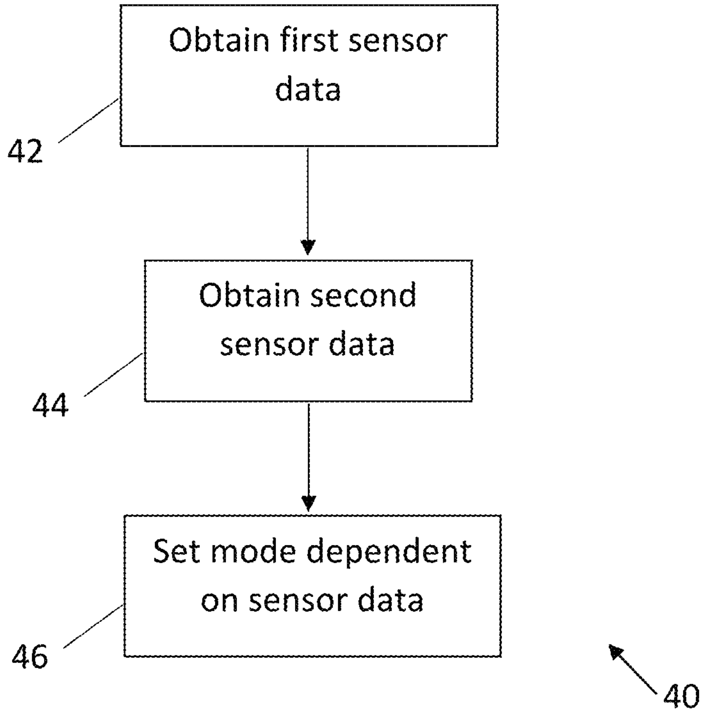
FIGS. 4 to 7 are flow charts showing algorithms in accordance with example embodiments.

FIG. 4 is a flow chart showing an algorithm, indicated generally by the reference numeral 40, in accordance with an example embodiment. The algorithm 40 may be implemented using the system 30.

The algorithm 40 starts at operation 42, where first sensor data are obtained from the first earphone 32 of the pair of earphones. At operation 44, second sensor data are obtained from the second earphone 34 of the pair of earphones. Of course, the operations 42 and 44 could be performed in a different order, or at the same time.

The first and second data may take many forms. The data may, for example, be physiological data (e.g. for fitness tracking). Other examples include inertial measurement unit data, microphone data (e.g. detecting internal body sounds), RSSI data, galvanic skin response data, EEG data, PPG data etc.

At operation 46, a mode of operation is set dependent on the sensor data obtained in the operations 42 and 44. For example, the system 30 may operate in a first mode in the event that the pair of earphones is determined to be worn or used by a single user and the system 30 may operate in a second mode in the event that the pair of earphones is determined to be worn or used by different users.

The inventors have realised that, when two earphones are worn by the same user, both earphones may generate sensor streams with similar characteristics. For example, motion signals may change similarly (in space and/or time) depending on a head movement of the (single) user. Audio signals may also be similar due to the similar, relative distance from a sound source. On the contrary, when two earphones are worn by different users, data provided by such data streams may be different.

In one example implementation of the operation 46, it may be assumed two earphones are worn by the same user (and the mode of operation set accordingly) if similar patterns of sensor signals from two earphones are observed, for example if two sensor signals are correlated over a period of time. Advantages of such analysis, over some existing user identification-based methods include:

- A training phase may not be required. Thus, the algorithm 40 may be immediately deployable, without requiring user-specific training.
- The algorithm 40 may be suitable for continuous operation due to lightweight processing, for example reducing power consumption and therefore battery requirements.
- The algorithm 40 may be robust to daily-life situations where new, previously unseen, biometric data such as fingerprints may be observed, without the need for these to have been previously-registered to permit the identification of users.

Figure 5:
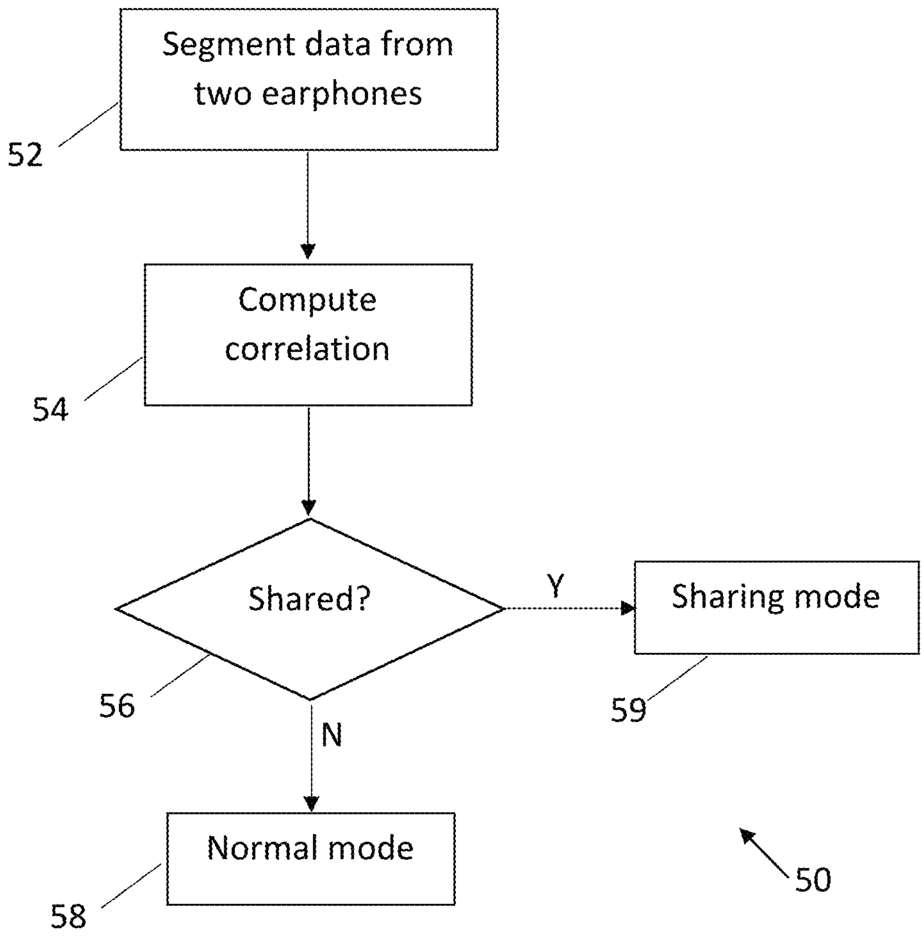

FIG. 5 is a flow chart showing an algorithm, indicated generally by the reference numeral 50, in accordance with an example embodiment. The algorithm 50 may be implemented using the system 30 described above. The algorithm 50 may, for example, be implemented at one or more of the earphones 32, 34 and/or at the user device 36. For example, segmentation and correlation computation may be conducted at the earphones or some or all of the data may be provided to a connected smartphone or similar device for processing.

The algorithm 50 starts at operation 52, where data from two earphones of a pair (such as the earphones 32 and 34) are segmented.

Table 1 below provides examples of sensors and the indication of the corresponding sensor data. The operation 52 may use a combination of sensors, such as one or more of the sensors below. Of course, many other sensors could be used instead of, or in addition to, sensors on the list below. The set of sensors may, for example, be selected based on the availability, the energy budget, and the target accuracy by a user, a system developer, or a manufacturer.

TABLE 1

Example sensor types and corresponding sensor data

| Sensor Type | Sensor Data |
|---|---|
| Inertial Measurement Unit (IMU) | (Head) Movement |
| PPG (photoplethysmogram) | Blood volume change |
| Outward-facing microphone | Background noise |
| Inward-facing microphone | Internal body sounds |
| Bluetooth/Wi-Fi microphone | Proximity to other devices |
| Galvanic skin response (GSR) | Emotional status |
| Electroencephalogram (EEG) | Brain activity |

At operation 54, a correlation between the first and second data (as segmented in the operation 52) is determined.

For the computation of the correlation between two sensor streams, one or more of a number of distance functions can be used, such as: Euclidean distance, cross-correlation, cosine similarity, dynamic time warping (DTW), Tanimoto coefficient distance, and so on. Dynamic time warping (DTW) may be used which can measure similarity between two temporal sequences which may vary in speed, because there could be time synchronisation issues on wireless earphones and DTW is robust to the time synchronisation errors.

Note that the correlation can be computed either using raw sensor data or feature data (relating to features extracted from or determined based upon the raw sensor data), depending on the type of sensors.

At operation 56, the computed correlation(s) are used to determine whether the pair of earphones is likely to be being worn or used by a single user or by different users. This determination may be based on degree of correlation between said first and second sensor data (as determined in the operation 54). Note that training is not typically required in order to make such a determination.

Where multiple sensors are used, the correlations in operation 54 may be computed separately for each sensor or sensor type. The separately generated correlations may then be merged (e.g. fused) into a single indication of similarity. This may be implemented using a simple average, a weighted average, using a machine learning algorithm, or in some other way.

For example, an overall correlation may be computed by using a weighted sum and determining an event based on a threshold (which can be learned using personal data). For example, when IMU and PPG sensor data are available, the final correlation may be defined as "$w_1$*corr($IMU_{left}$, $IMU_{right}$)+$w_2$*corr($PPG_{left}$, $PPG_{right}$)", where $w_1$ and $w_2$ are the weight coefficients.

In a machine learning approach, the set of the correlation values could be used as an input of a classifier and the decision made based on the output of the classifier. Examples of the classifiers are support vector machine (SVM), decision tree, random forest, and neural network, but the skilled person will be aware of other options.

If the pair of earphones is determined (in the operation 56) to be being worn by a single user (e.g. if the relevant sensor data is highly correlated), then the algorithm moves to operation 58, where a single user mode (e.g. a normal mode of operation) is entered. If the pair of earphones is determined (in the operation 56) to be being worn by different users (e.g. if the relevant sensor data is not highly correlated), then the algorithm moves to operation 59, where a sharing mode of operation is entered.

The operation is the single user/normal mode (in operation 58) or the sharing mode (in operation 59) may take many forms. A number of example scenarios are discussed further below.

An audio output mode may be selected dependent on the operating mode. For example, a stereo output may only be provided in the single-user mode. Moreover, in the shared mode, the users may be able to customise the listening experience individually. This might include (but is not limited to) independent volume adjustment and independent music equalization between left and right earphones.

For active noise cancelling earphones, automatic noise cancelling (ANC) functionality may be disabled automatically in the shared mode. This may avoid discomfort for the users since having only one earphone with ANC functionality enabled and the other ear free can be unpleasant and/or disorientating for a user. The effect of ANC can be significantly reduced when only a single earbud is worn, since ambient sound will still be heard from the other ear; deactivating ANC in such a scenario permits a reduction in power consumption and processing that would otherwise be devoted to ANC.

A voice command interface (e.g. for accessing a virtual assistant) may be disabled (or partially disabled) when the apparatus is operating the sharing mode. For example, some virtual assistants are triggered when a user says a designated "wake word". Such applications may include user identification of the wake word speech to prevent triggering by other people. However, once the service is activated, user identification is typically not further applied for the speech command. Thus, if the service is activated (either intentionally by an owner, or unwantedly due to the false positive of wake word detection), nearby people's following speech may be recognized as a voice command. Thus, limiting, or preventing, the use of voice commands in the sharing mode may be advantageous.

Some devices (e.g. some smartphones) allow earphones to automatically read out the content of incoming messages. Such messages could contain private content that the user does not want to share with others. Accordingly, this feature could be disabled in the sharing mode or replaced with a notification indicating an event such as the reception of a new message but withholding personal information such as the content of that message and/or the identity of the sender.

Other functions could be deactivated in the sharing mode (e.g. health monitoring, data collection etc.) Alternatively, instead of disabling monitoring data such as heart rate, emotional status, physical activity etc., independent biomarker monitoring may be provided. For example, if the two users sharing the earphones are training together, the data may be made visible to both users. This might, for example, enable the users to compete to see who gets to a higher/lower heart rate sooner. Similarly, this could be useful in an emergency situation where the earphones can be used to monitor vitals of two people simultaneously.

In the sharing mode, user interaction may be restricted to one of the pair of earphones (e.g. to one of the users). For example, if person A shares the earphones with person B (e.g. a guest), the system can prevent person B from interacting with the earphones in defined ways (e.g., play/pause/stop/skip music or adjust the volume). Similarly, the system could prevent an automatic content pause when the person B removes the earphone.

Obtained user data may be provided only to the relevant user in the sharing mode. For example, heart rate data may be measured for both users, with each user being presented with information based on their own heart rate (and not the heart rate of the other user).

Figure 6:
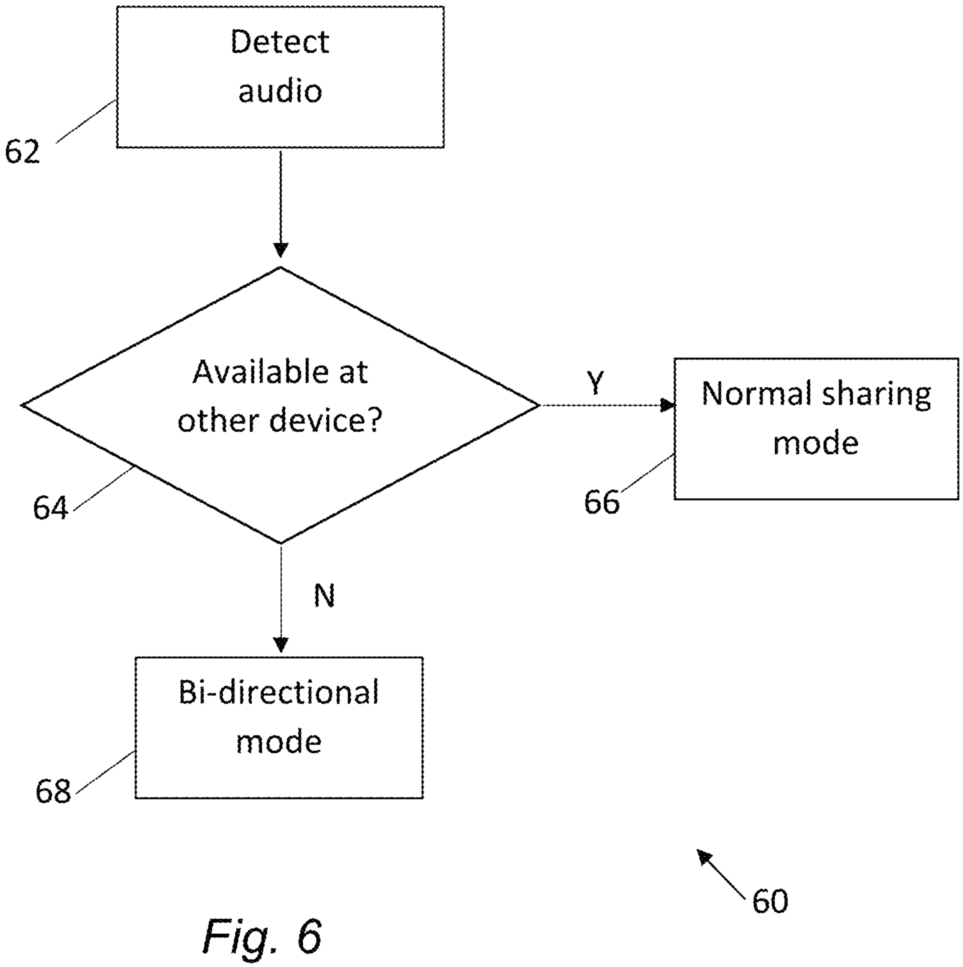

FIG. 6 is a flow chart showing an algorithm, indicated generally by the reference numeral 60, in accordance with an example embodiment. The algorithm 60 is an example implementation of a sharing mode.

The algorithm 60 shows a bi-directional audio exchange (or "walkie-talkie") mode when two earphones are shared between people that are still in radio range but might have problems communicating with each other. Some example scenarios in which this might be relevant include riding motorcycles, swimming or working in a noisy environment. The detection that the earphones are shared might prompt the user to select this mode which enables bi-directional audio exchange between the earphones.

The algorithm 60 starts at operation 62, where audio is detected at one of the earphones of a pair. For example, user speech might be detected.

Next, at operation 64, a determination is made regarding whether the audio detected in the operation 62 is available (e.g. detectable) at the other earphone of the pair. If so, the algorithm moves to operation 66; otherwise, the algorithm moves to operation 68.

At operation 66, a normal sharing mode is provided. In contrast, at operation 68, bi-directional audio exchange between the earphones of the pair is enabled. A prompt may be provided to enable this mode.

Figure 7:
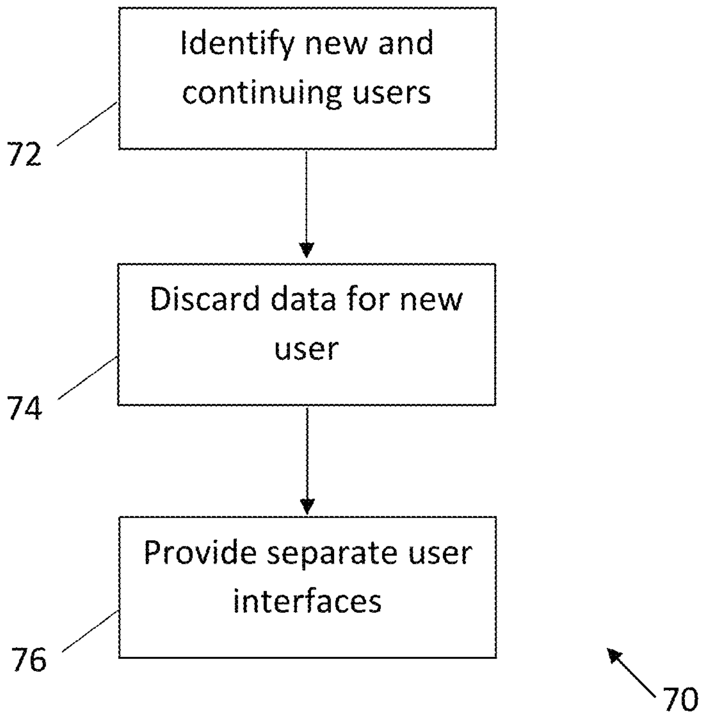

FIG. 7 is a flow chart showing an algorithm, indicated generally by the reference numeral 70, in accordance with an example embodiment. The algorithm 70 is an example implementation of a sharing mode in which two users are using different ones of a pair of earphones. More specifically, in the algorithm 70, a first (continuing) user has been using both earphones in the past and is now sharing the earphones with a second (new) user.

The algorithm 70 starts at operation 72, where new and original/continuing users are identified when changing from operating in the first (single user) mode of operation to operating in the second (sharing) mode of operation. The original user may be identified, for example, based on continuity of sensor data and/or similarity of sensor data before and after the change in mode of operation.

At operation 74, sensor data for the new user and the original/continuing user are separated. For example, the sensor data for the new user may be discarded. In this way, the sensor data for the continuing user can be maintained, without that data becoming corrupted with sensor data for a different user.

At operation 76, separate user interfaces are provided by the new user and the continuing user.

It should be noted that is some example embodiments, one of the operations 74 and 76 may be omitted.

Figure 8:
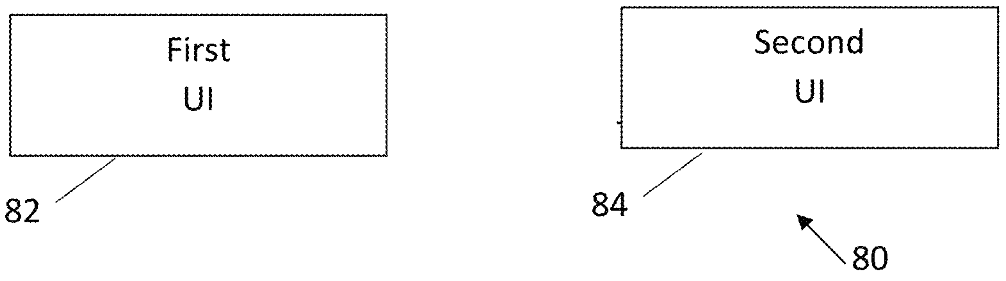
FIG. 8 is a block diagram showing user interfaces in accordance with an example embodiment.

FIG. 8 is a block diagram showing user interfaces, indicated generally by the reference numeral 80, in accordance with an example embodiment. The user interfaces include a first user interface 82 that may be provided to the continuing/original user identified in the operation 72 and a second user interface 84 that may be provided to the new user. The user interfaces may, for example, enable different data to be presented to the two users; for example, only sensor data captured by the earphone being used by the respective user may be presented. Moreover, the user interfaces may provide different user input options; for example, the original/continuing user may have more control options that the new user.

Figure 9:
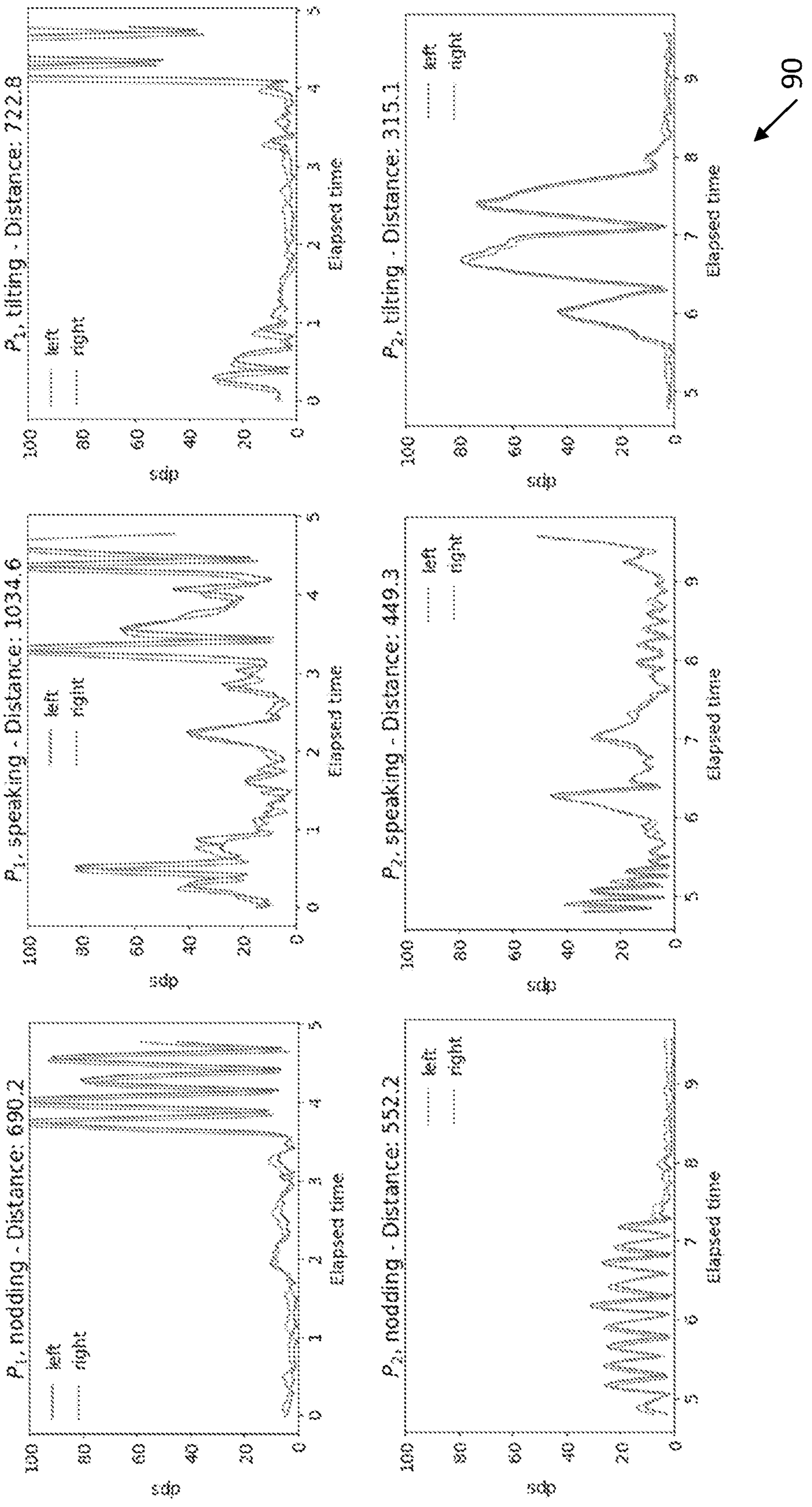
FIGS. 9 to 11 are plots showing data generated in accordance with example embodiments.
Figure 10:
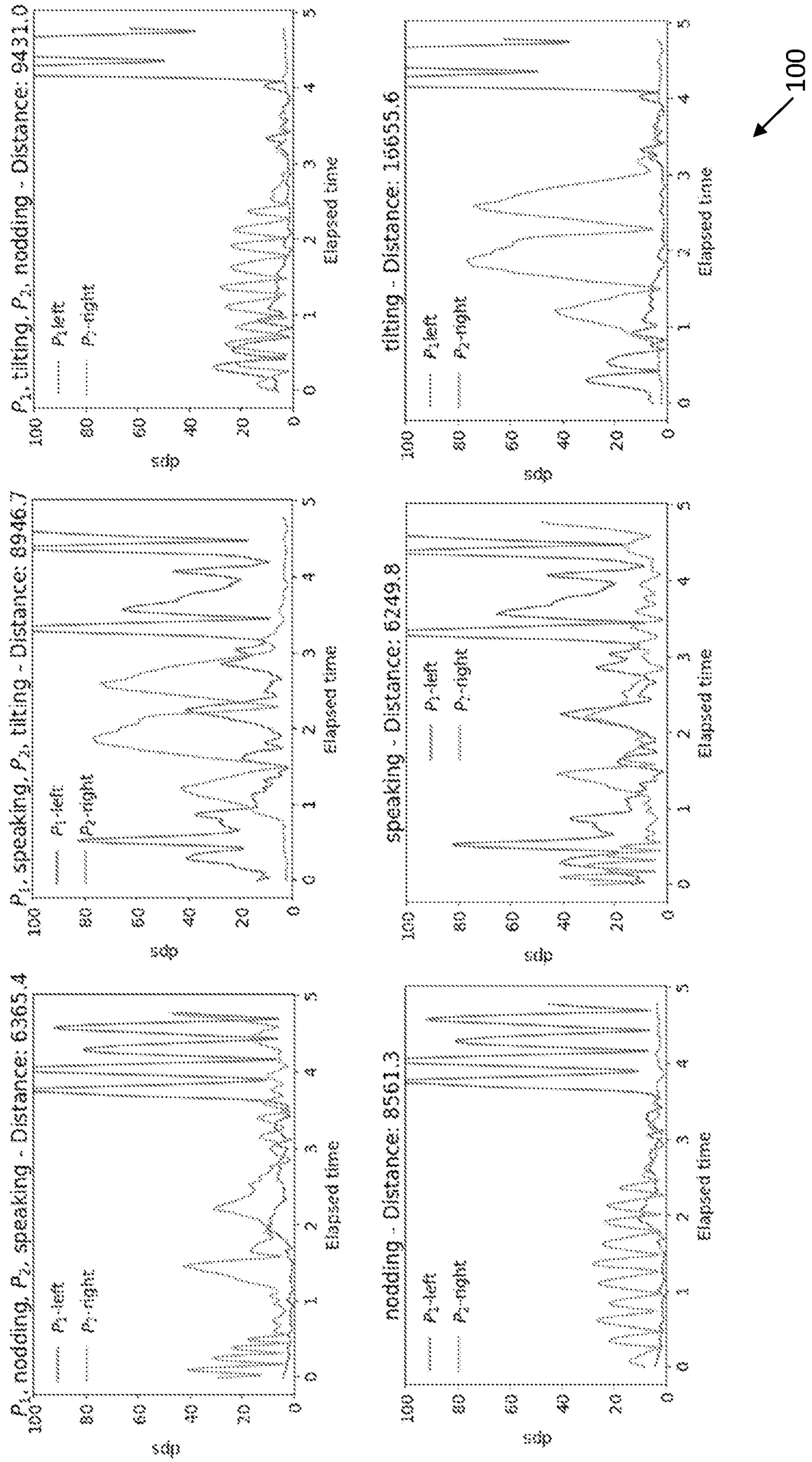
Figure 11:
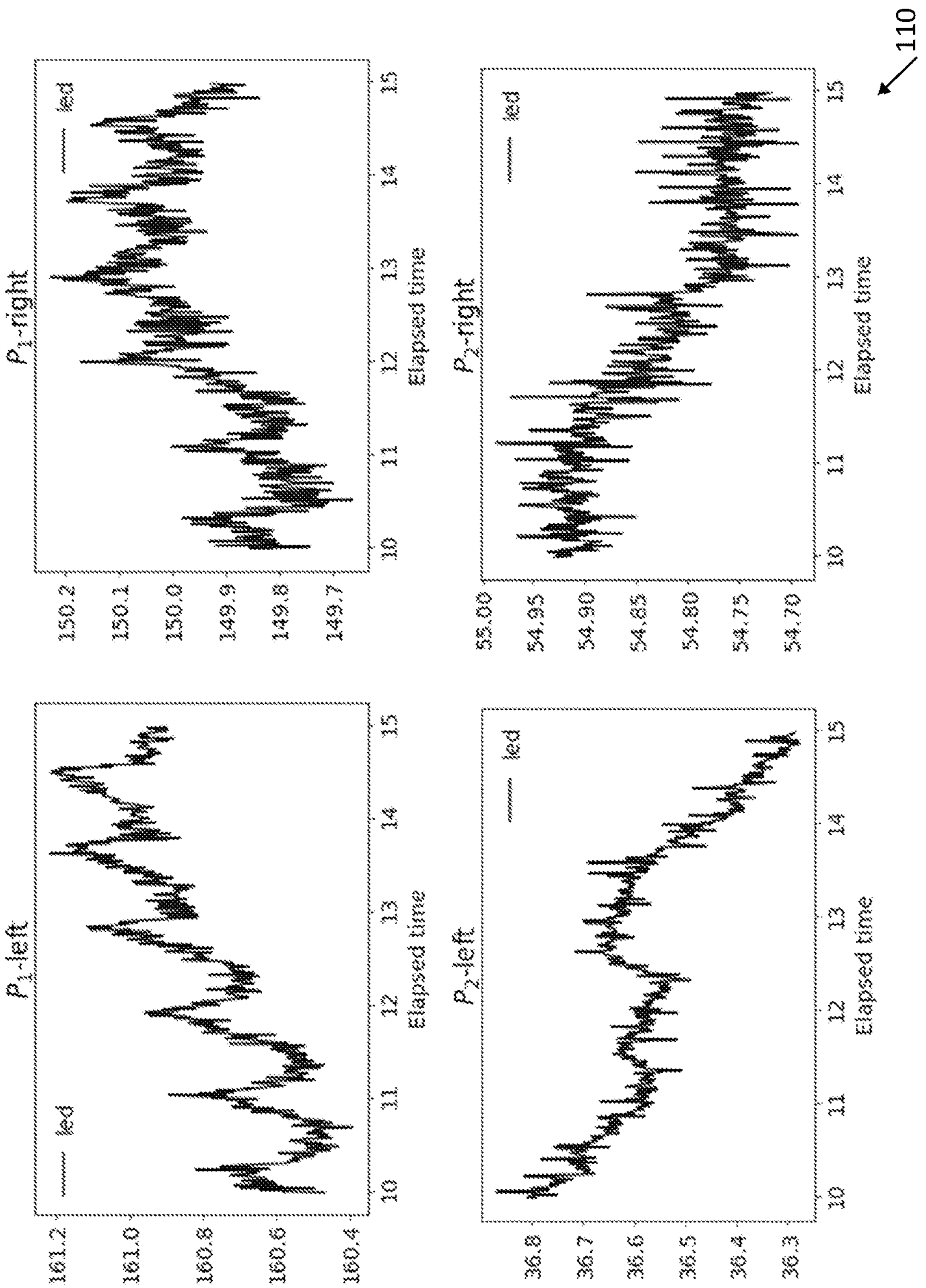

FIGS. 9 to 11 are plots showing sensor data that might be generated in example embodiments.

FIG. 9 is a plot, indicated generally by the reference numeral 90, showing data generated in accordance with an example embodiment.

More specifically, the plot 90 shows several traces of gyroscope magnitude when two earphones are worn by a single user for three different activities: nodding, speaking, and tilting. The first row shows three activities of one user ($P_1$) and the second row shows three activities of another user ($P_2$). As shown in FIG. 9, the gyroscope shows a very high correlation between two earphones, especially whenever a movement is made. The distance values in the plots indicate the DTW distance between left and right signals.

FIG. 10 is a plot, indicated generally by the reference numeral 100, showing data generated in accordance with an example embodiment. The plot 10 shows gyroscope traces when the earphones are worn by different users (left earphone on $P_1$ and right earphone on $P_2$). The first row shows three cases when two users perform different activities, and the second row shows three cases when two users perform the same activity at the same time. As we can easily see, the distance between left and right signals becomes much larger when two earphones are worn by different users because they do not often show synchronous behaviours anymore. Even in the less likely situations in the second row, the correlation is still very low (i.e., large distance).

FIG. 11 is a plot, indicated generally by the reference numeral 110, showing data generated in accordance with an example embodiment. More specifically, the plot 110 shows PPG data for two users.

The plot no shows the stream of PPG data when two users stay still. The upper two graphs show the PPG stream from the left and right earphones of $P_1$ and the lower two graphs show the PPG stream of $P_2$. We can observe a similar trend. For example, the distance between $P_1$-left and $P_1$-right and between $P_2$-left and $P_2$-right is 5428.7 and 9130.7, whereas the distance between $P_1$-left and $P_2$-right is 52991.5; note that the y-axis range is all different.

As discussed above with reference to Table 1, PPG data indicates the blood volume change, which can be further used to estimate biometric fingerprints such as heart rate, heart rate variability, SpO2, and respiration rate. Thus, it is also reasonable to expect that two PPG streams from the same user will show high correlation, whereas two streams from different users will show low correlation.

Figure 12:
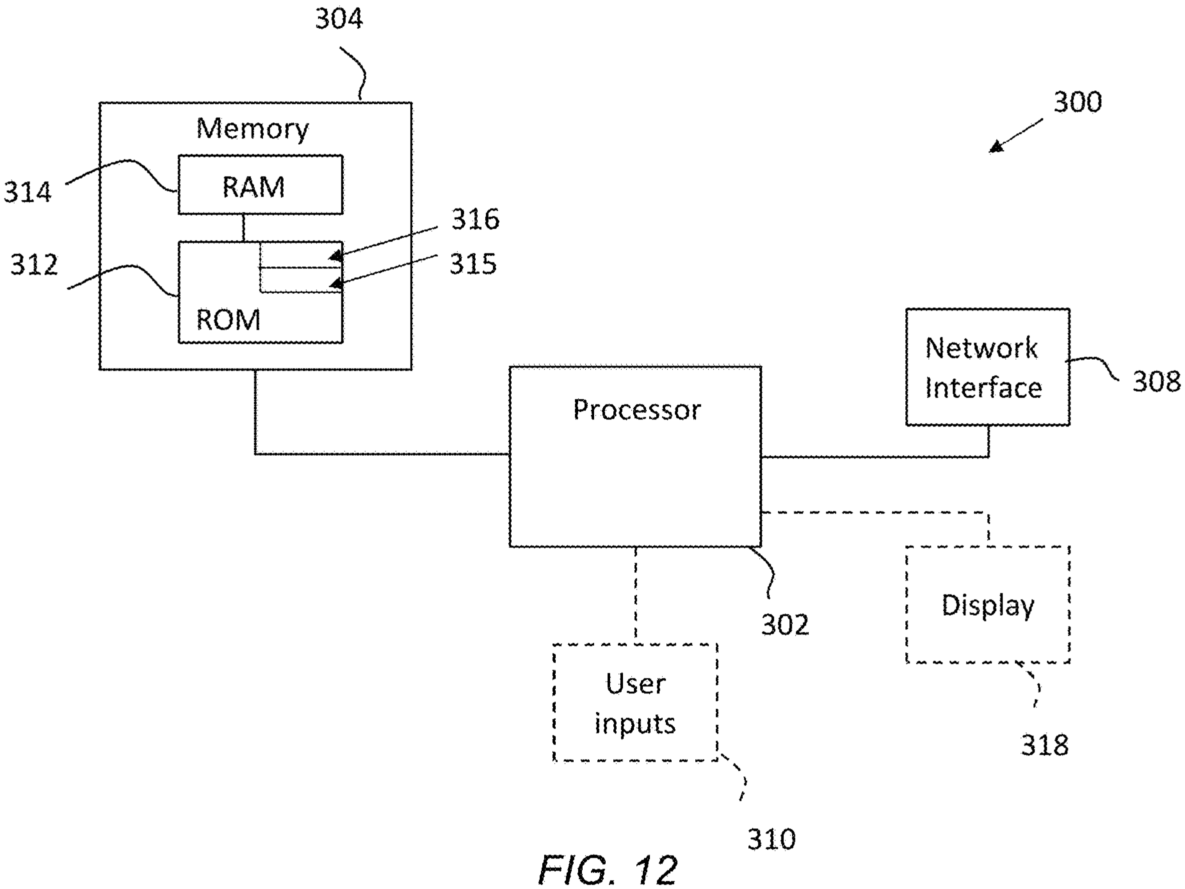
FIG. 12 is a block diagram of components of a system in accordance with an example embodiment.

For completeness, FIG. 12 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a Random Access Memory (RAM) 314 and a Read Only Memory (ROM) 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a Hard Disk Drive (HDD) or a Solid State Drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 40, 50, 60 and 70 described above. Note that in the case of small device/apparatus the memory can be most suitable for small size usage i.e. not always a Hard Disk Drive (HDD) or a Solid State Drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 13:
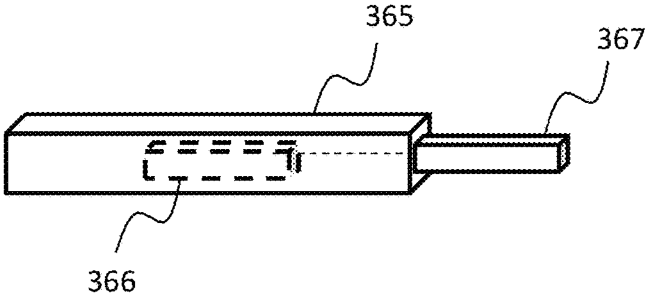
FIG. 13 shows an example of tangible media for storing computer-readable code which when run by a computer may perform methods according to example embodiments described above.

FIG. 13 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present disclosure may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and sequences of FIGS. 4 to 7 are examples only and that various operations depicted therein may be omitted, reordered and/or combined.

It will be appreciated that the above-described examples are purely illustrative and are not limiting on the scope of the disclosure. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the disclosure are set out in the independent claims, other aspects of the disclosure comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present disclosure as defined in the appended claims.

The invention claimed is:

1. An apparatus comprising: at least one processor; and at least one memory storing instructions that, when executed by the at least one processor, cause the apparatus at least to:

obtain first sensor data from a first earphone of a pair of earphones;

obtain second sensor data from a second earphone of the pair of earphones;

operate in a first mode in the event that the pair of earphones is determined to be worn by a single user, wherein in the first mode, the first and second sensor data are treated as being related to said single user;

operate in a second mode in the event that the pair of earphones is determined to be worn or used by different users, wherein in the second mode, the first and second sensor data are treated as being related to said different users;

identify an original user and a new user when the apparatus changes from operating in the first mode to operating in the second mode, wherein the original user is identified based on at least one of continuity and similarity of sensor data; and retain sensor data for the original user comprising both the first and second sensor data that was obtained in the first mode, and only the first or the second data treated as relating to the original user that was obtained when operating in the second mode.

2. The apparatus as claimed in claim 1, wherein the instructions, when executed by the at least one processor, further cause the apparatus to:

disable a voice command interface when the apparatus is operating the second mode.

3. The apparatus as claimed in claim 1, wherein the instructions, when executed by the at least one processor, further cause the apparatus to:

provide said sensor data to the respective user when the apparatus is operating in the second mode.

4. The apparatus as claimed in claim 1, wherein the instructions, when executed by the at least one processor, further cause the apparatus to:

select an audio output mode depending on whether the apparatus is operating in the first mode or the second mode.

5. The apparatus as claimed in claim 1, wherein the instructions, when executed by the at least one processor, further cause the apparatus to:

separate sensor data for the original user and the new user in the second modes.

6. The apparatus as claimed in claim 1, wherein the instructions, when executed by the at least one processor, further cause the apparatus to:

provide a separate user interface for each of the original and new users.

7. The apparatus as claimed in claim 1, wherein the instructions, when executed by the at least one processor, further cause the apparatus to:

enable bi-directional audio exchange between the earphones of the pair when the apparatus is operating in the second mode.

8. The apparatus as claimed in claim 1, wherein the instructions, when executed by the at least one processor, further cause the apparatus to:

determine whether the pair of earphones is being worn or used by said single user or by said different users.

9. The apparatus as claimed in claim 8, wherein the instructions, when executed by the at least one processor, further cause the apparatus to:

determine a correlation between said first and second sensor data, wherein determining whether the pair of earphones is being worn or used by said single user or by said different users is dependent on the degree of correlation between said first and second sensor data.

10. The apparatus as claimed in claim 9, wherein, in the event that said sensor data includes data from a plurality of sensor types, the determining of said correlation determines said correlation separately for each sensor type.

11. A method comprising:

obtaining first sensor data from a first earphone of a pair of earphones;

obtaining second sensor data from a second earphone of the pair of earphones;

operating in a first mode in the event that the pair of earphones is determined to be worn or used by a single user, wherein in the first mode, the first and second sensor data are treated as being related to said single user;

operating in a second mode in the event that the pair of earphones is determined to be worn or used by different users, wherein in the second mode, the first and second sensor data are treated as being related to said different users;

identifying an original user and a new user when the apparatus changes from operating in the first mode to operating in the second mode, wherein the original user is identified based on at least one of continuity and similarity of sensor data; and retaining sensor data for the original user comprising both the first and second sensor data that was obtained in the first mode, and only the first or the second data treated as relating to the original user that was obtained when operating in the second mode.

12. The method as claimed in claim 11, further comprising:

disabling a voice command interface when the apparatus is operating the second mode.

13. The method as claimed in claim 11, further comprising:

providing said sensor data to the respective user when the apparatus is operating in the second mode.

14. The method as claimed in claim 11, further comprising:

selecting an audio output mode depending on whether the apparatus is operating in the first mode or the second mode.

15. A non-transitory computer readable medium comprising program instructions which, when executed by an apparatus, cause the apparatus to perform at least the following:

obtaining first sensor data from a first earphone of a pair of earphones;

obtaining second sensor data from a second earphone of the pair of earphones;

operating in a first mode in the event that the pair of earphones is determined to be worn or used by a single user, wherein in the first mode, the first and second sensor data are treated as being related to said single user;

operating in a second mode in the event that the pair of earphones is determined to be worn or used by different users, wherein in the second mode, the first and second sensor data are treated as being related to said different users;

identifying an original user and a new user when the apparatus changes from operating in the first mode to operating in the second mode, wherein the original user is identified based on at least one of continuity and similarity of sensor data; and retaining sensor data for the original user comprising both the first and second sensor data that was obtained in the first mode, and only the first or the second data treated as relating to the original user that was obtained when operating in the second mode.

* * * * *